United States Patent
Wang et al.

(10) Patent No.: US 9,929,632 B2
(45) Date of Patent: Mar. 27, 2018

(54) LOW-CARBON ECONOMICAL ELECTROMAGNETIC FAN CLUTCH

(71) Applicant: LONGKOU ZHONGYU THERMAL MANAGEMENT SYSTEM TECHNOLOGY CO. LTD, Longkou, Shandong (CN)

(72) Inventors: Zhaoyu Wang, Shandong (CN); Ziyi Xing, Shandong (CN)

(73) Assignee: LONGKOU ZHONGYU THERMAL MANAGEMENT SYSTEM TECHNOLOGY CO. LTD, Longkou, Shandong (CN)

( * ) Notice: Subject to any disclaimer, the term of this patent is extended or adjusted under 35 U.S.C. 154(b) by 258 days.

(21) Appl. No.: 14/778,137

(22) PCT Filed: Mar. 27, 2013

(86) PCT No.: PCT/CN2013/073266
§ 371 (c)(1),
(2) Date: Sep. 18, 2015

(87) PCT Pub. No.: WO2014/153736
PCT Pub. Date: Oct. 2, 2014

(65) Prior Publication Data
US 2016/0072374 A1    Mar. 10, 2016

(51) Int. Cl.
| H02K 7/10 | (2006.01) |
| F16D 27/09 | (2006.01) |
| H02K 49/04 | (2006.01) |
| F01P 5/04 | (2006.01) |
| F01P 7/08 | (2006.01) |

(52) U.S. Cl.
CPC ............ *H02K 49/046* (2013.01); *F01P 5/04* (2013.01); *F01P 7/084* (2013.01); *F01P 2005/046* (2013.01)

(58) Field of Classification Search
CPC ............ H02K 7/10; F01P 7/12; F16D 27/004
USPC .................. 310/76, 78, 100; 192/192.48
See application file for complete search history.

(56) References Cited

FOREIGN PATENT DOCUMENTS

| CN | 201517441 U | * | 6/2010 |
| CN | 202391543 | | 8/2012 |
| CN | 202926453 | | 5/2013 |
| CN | 203394627 | | 1/2014 |

(Continued)

*Primary Examiner* — Jose Gonzalez Quinones

(57) ABSTRACT

A low-carbon economical electromagnetic fan clutch includes a spindle and a fan fixing disc, wherein the low-carbon economical electromagnetic fan clutch further includes an eddy current disc. The fan fixing disc and the eddy current disc are sequentially arranged at a left end of the spindle along an axial direction from left to right; one or multiple groups of permanent magnets are arranged on the fan fixing disc around the spindle, and a conductive non-magnetic-conductive material is fixed at a corresponding position of the eddy current disc; the fan fixing disc is rotationally connected with the spindle through a first bearing, and the eddy current disc is rotationally connected with the spindle through a second bearing. In the low-carbon economical electromagnetic fan clutch, an electromagnetic eddy current high heat accumulation area is effectively separated from the fan fixing disc rotating at a high speed.

20 Claims, 6 Drawing Sheets

(56) References Cited

FOREIGN PATENT DOCUMENTS

EP            0634568       1/1995
EP            1988263 A2 * 11/2008   ............... F01P 5/04

\* cited by examiner

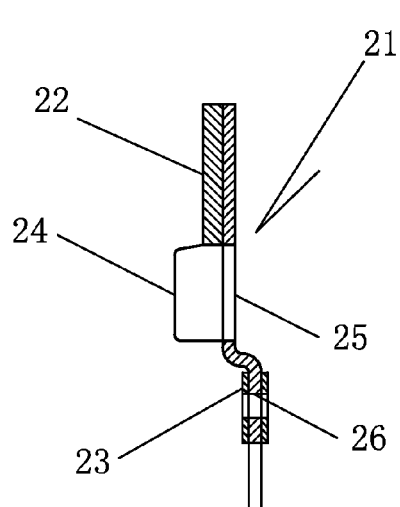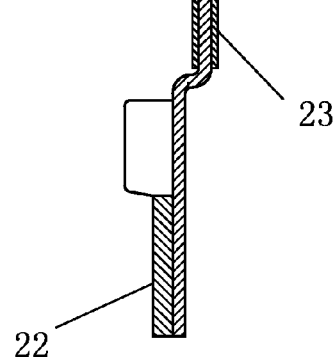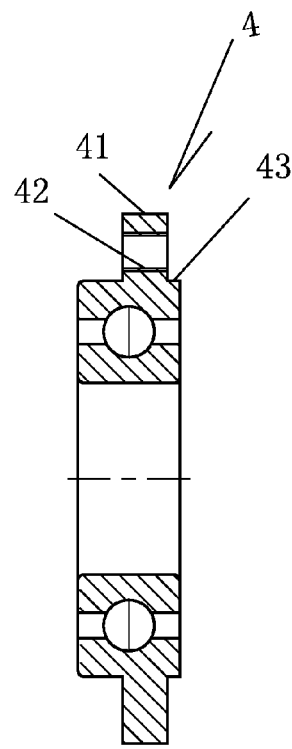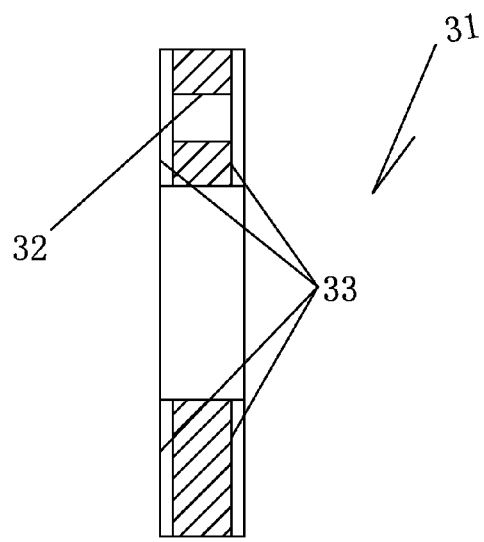
Fig. 3
Fig. 4
Fig. 5

LOW-CARBON ECONOMICAL ELECTROMAGNETIC FAN CLUTCH

CROSS REFERENCE OF RELATED APPLICATION

This is a U.S. National Stage under 35 U.S.C 371 of the International Application PCT/CN2013/073266, filed Mar. 27, 2013.

BACKGROUND OF THE PRESENT INVENTION

Field of Invention

The present invention relates to a fan clutch, and more particularly to an electromagnetic fan clutch.

Description of Related Arts

Electromagnetic fan clutches are widely used in the field of vehicle engine radiating, wherein a variable speed electromagnetic fan clutch with a flexible connection has the characteristics of timely temperature response, small impact force of changing the working state, and the like. A flexible connecting structure adopted by the variable speed electromagnetic fan clutch is mainly based on the principle of magnetic field traction or eddy current magnetic field traction, which is produced by relative motion of a soft iron disc and a permanent magnet.

However, in the flexible connection process of the electromagnetic fan clutches, due to the unavoidable thermal effect in an electromagnetic conversion process, a lot of heat is produced, which generates great impact on the stability and the service lives of the electromagnetic fan clutches working in harsh environments.

An illustration is given by taking a three-speed electromagnetic fan clutch with the Chinese Patent Application CN200810139812.9 as an example, wherein: a fan fixing disc, a magnet fixing disc, a driving disc and an electromagnet core are sequentially arranged along the axial direction of a spindle; a soft iron disc is installed on the inner end face of the cavity of the fan fixing disc; permanent magnets are installed on opposite end faces of the magnet fixing disc. When flexible connection is carried out, a lot of heat produced by eddy current is accumulated on the soft iron disc. Since no good radiating space or radiating way is available in the clutch, the conventional radiating manner is to increase the external superficial area of the fan fixing disc to prevent the heat from being transmitted to a bearing to damage the bearing, and then the dynamic balance of the fan fixing disc is damaged to break the fixation of blades. Due to the conventional radiating manner, the surface shape of the fan fixing disc cannot be reduced, and thus the material and energy consumption requirements in a manufacturing process are higher.

Another illustration is given by taking an electromagnetic flexible fan clutch with the Chinese Patent Application CN200520084351.1 as an example, wherein: a driving disc, a stepped shaft sleeve, a fan hub and a belt pulley are sequentially arranged along the axial direction of a spindle; and a magnet fixing disc is connected via the stepped shaft sleeve and a bearing. An annular magnetic conductive iron sheet is arranged in the driving disc; permanent magnets are embedded in corresponding end faces of the magnet fixing disc, and the permanent magnets rotate relatively to generate flexible connection. Serving as an eddy current disc producing heat, the driving disc is installed on the outer side of the clutch and is arranged to be separated from the fan hub connected with blades, such that the driving disc where the annular magnetic conductive iron sheet accumulating heat is located is away from the bearing of the fan hub, in order to prevent the heat from being transmitted onto the bearing connected with the spindle. However, due to this structure, the fan hub is inconvenient to disassemble and assemble, thus the maintenance difficulty is increased. Meanwhile, due to the use of the stepped shaft sleeve, the costs of production materials and energy consumption are increased, and the yield is reduced.

SUMMARY OF THE PRESENT INVENTION

A purpose of the present invention is to provide a low-carbon economical electromagnetic fan clutch, for solving the technical problem that in flexible connection of an electromagnetic fan clutch, a connecting bearing and a connecting blade structure of a fan fixing disc are liable to be damaged due to heat produced by electromagnetic eddy current.

The low-carbon economical electromagnetic fan clutch of the present invention includes a spindle and a fan fixing disc, wherein: the low-carbon economical electromagnetic fan clutch further includes an eddy current disc; the fan fixing disc and the eddy current disc are sequentially arranged at a left end of the spindle along an axial direction from left to right; one group or multiple groups of first permanent magnets are arranged on the fan fixing disc around the spindle; a first conductive non-magnetic-conductive material is fixed at a corresponding position of the eddy current disc; the fan fixing disc is rotationally connected with the spindle through a first bearing, and the eddy current disc is rotationally connected with the spindle through a second bearing.

A disc body of the eddy current disc is annular and has three annular bands along a radial direction from outside to inside, namely an induction area, a radiating area and a thermal insulation area. The first non-magnetic-conductive material is fixed on the induction area; a thermal insulation material is arranged on the thermal insulation area; the radiating area is composed of radiating fins or radiating ribs used for connecting the induction area and the thermal insulation area. A first connecting hole is formed on the thermal insulation area, and an air hole corresponding to a position of the radiating area is formed on the fan fixing disc around the spindle.

The radiating fin is an axial flow type radiating fin or a centrifugal radiating fin.

The thermal insulation material is coated on the thermal insulation area, or forms a thermal insulation pad adjacent to the thermal insulation area.

The thermal insulation pad is a circular ring-shaped thin plate. A third connecting hole corresponding to the first connecting hole is formed on the thin plate, and grooves pointing to a center are formed on left and right end faces of the thin plate.

A fixing ring in the same axial direction is arranged on an excircle of the second bearing. A second connecting hole corresponding to the first connecting hole is formed on the fixing ring, and a right end face of the fixing ring is located at a left side of a right end face of the second bearing.

Preferably, the first permanent magnets are arranged on a right end face of the fan fixing disc, and the first conductive non-magnetic-conductive material is fixed at a corresponding position on a left end face of the eddy current disc. The low-carbon economical electromagnetic fan clutch further includes a second permanent magnet and a second conductive non-magnetic-conductive material, wherein: the second permanent magnet is arranged on an inner end face of a circumferential wall of the fan fixing disc, and the second conductive non-magnetic-conductive material is fixed at a corresponding position on a circumferential wall of the eddy current disc.

Preferably, the first permanent magnets are arranged on an inner end face of a circumferential wall of the fan fixing disc, and the first conductive non-magnetic-conductive material is fixed at a corresponding position on a circumferential wall of the eddy current disc. The low-carbon economical electromagnetic fan clutch further includes a second permanent magnet and a second conductive non-magnetic-conductive material, wherein: the second permanent magnet is arranged on a right end face of the circumferential wall of the fan fixing disc, and the second conductive non-magnetic-conductive material is fixed at a corresponding position in a circumferential wall of a transmission disc.

According to the low-carbon economical electromagnetic fan clutch of the present invention, an electromagnetic eddy current high heat accumulation area is effectively separated from the fan fixing disc rotating at a high speed; the electromagnetic eddy current disc independently loads the electromagnetic eddy current heat produced by flexible connection. The fan fixing disc can be designed only from an aspect of facilitating a blade rotating efficiency without considering maintaining an outline size and the radiating area for radiating, so that a manufacturing process of the fan fixing disc is simplified and a manufacturing cost is lowered. The fan fixing disc is arranged on an outer side of the clutch, which is conducive to maintain blades and the fan fixing disc and protect the electromagnetic eddy current disc at the same time.

The electromagnetic eddy current disc is arranged between the fan fixing disc and an electromagnet core or the transmission disc, so that deformation caused by external impact can be avoided. The end face of the electromagnetic eddy current disc does not need to load numerous permanent magnets anymore, so that a structural rigidity of the electromagnetic eddy current disc can be reduced; a structural weight can be reduced; and more practical thermal insulation protection measures can be increased to isolate heat transfer.

Meanwhile, since having different functions with the magnet fixing disc, a conductive material on the electromagnetic eddy current disc can be arranged to randomly match with positions of the permanent magnets on the fan fixing disc along the radial direction of the electromagnetic eddy current disc to further improve a rotating torque of the flexible connection. The special strengthening process of the magnetic material does not need to be considered, and the manufacturing cost will be further lowered. In the flexible connection, the electromagnetic eddy current disc can rotate at a high speed with the spindle, and no connection failure of the magnetic material will be generated, so that the low-carbon economical electromagnetic fan clutch of the present invention can be directly applicable to engines with high rotating speeds.

In the present invention, two groups of permanent magnets are arranged at different positions on the fan fixing disc, which can perfect the flexible connection torque and a differential rotating speed of one corresponding disc body and can also perfect the flexible connection torques and the differential rotating speeds of two corresponding disc bodies, such that a transmission structure of the fan fixing disc and other disc bodies is more flexible.

By means of the above structure, compared with a traditional model, in terms of energy consumption and materials used for manufacturing the low-carbon economical electromagnetic fan clutch of the present invention, large superiority is revealed, and economical and environment-friendly effects are achieved.

A further illustration of embodiments of the present invention will be given below in combination with accompanying drawings.

BRIEF DESCRIPTION OF THE DRAWINGS

FIG. 3 is a sectional view of the eddy current disc according to the Embodiment 1 of the present invention;

FIG. 4 is a sectional view of a second bearing according to the Embodiment 1 of the present invention;

FIG. 5 is a sectional view of a thermal insulation pad in a first alternative mode of the Embodiment 1 of the present invention;

DETAILED DESCRIPTION OF THE PREFERRED EMBODIMENT

Figure 1:
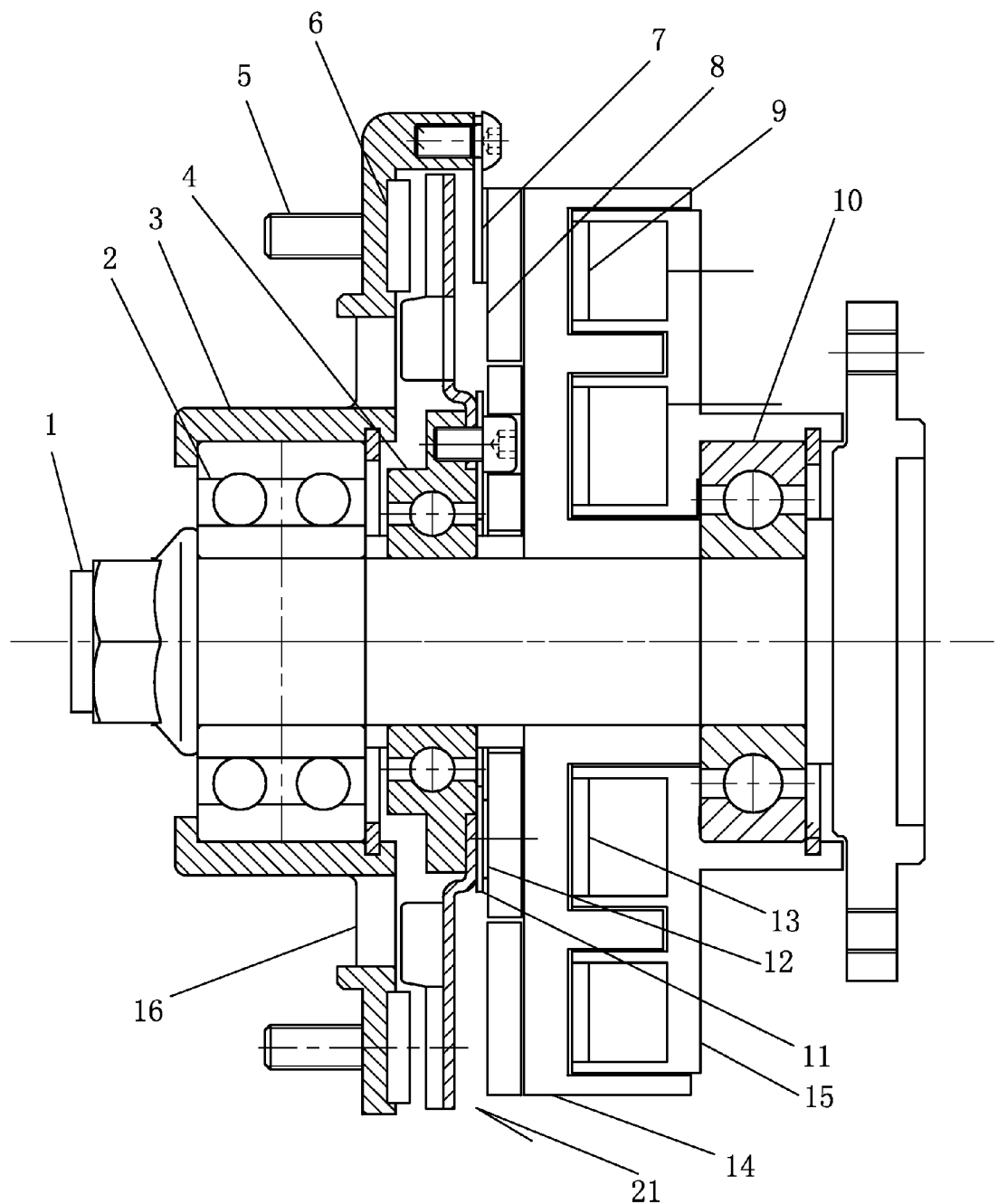
FIG. 1 is a structural schematic diagram of a low-carbon economical electromagnetic fan clutch according to an Embodiment 1 of the present invention.

As shown in FIG. 1, in an Embodiment 1 of the present invention, a fan fixing disc 3, an eddy current disc 21, a transmission disc 14 and an iron core 15 are sequentially arranged at one end of a spindle 1 of an electromagnetic fan clutch along an axial direction from left to right. The fan fixing disc 3 is rotationally connected with the spindle 1 through a first bearing 2, and the eddy current disc 21 is rotationally connected with the spindle 1 through a second bearing 4. The transmission disc 14 is fixedly connected with the spindle 1 through a semicircular key, and the iron core 15 is rotationally connected with the spindle 1 through a third bearing 10. A large suction disc 8 and a small suction disc 12 are arranged between the eddy current disc 21 and the transmission disc 14 in the same axial direction as the spindle 1. The small suction disc 12 and the large suction disc 8 are sequentially arranged along a radial direction from inside to outside. A right end of the fan fixing disc 3 is connected with a left end face of the large suction disc 8 through a large spring piece 7, and a right end of the eddy current disc 21 is connected with a left end face of the small suction disc 12 through a small spring piece 11. A small electromagnet core 13 corresponding to a position of the small suction disc 12 and a large electromagnet core 9 corresponding to a position of the large suction disc 8 are arranged on the iron core 15. Air holes 16 are opened on the fan fixing disc 3 around the spindle 1.

First permanent magnets 6 are arranged on a right end face of the fan fixing disc 3 around the spindle 1, and first copper plates are fixed at corresponding positions on the left end face of the eddy current disc 21 to serve as a first conductive non-magnetic-conductive material.

The air holes 16 are uniformly arranged and are symmetrically arranged in groups, and the first permanent magnets 6 are uniformly arranged and are symmetrically arranged in groups.

Since the eddy current disc is arranged independently, in flexible connection, a large amount of heat generated by an eddy current magnetic field can be separated from a direct conduction pathway along a disc body of the fan fixing disc 3 to the first bearing 2 in the prior art, in order to reduce an impact on the first bearing and blades, guarantee a long-term dynamic balance of the fan fixing disc 3 and guarantee a stability of connecting bolts of the blades. Therefore, when being used as a transmission component, the fan fixing disc 3 can keep low transmission loss with other connected transmission components.

Figure 2:
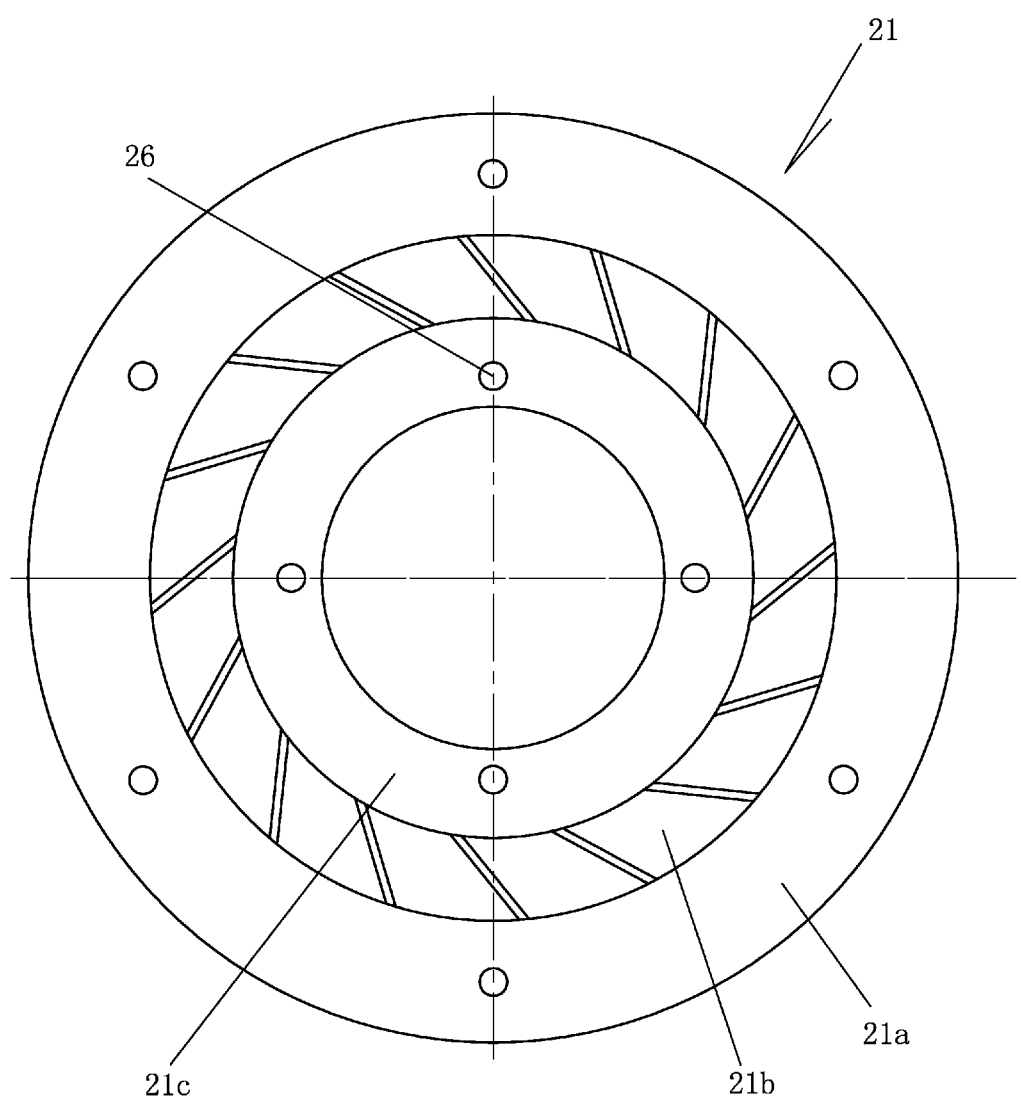
FIG. 2 is a structural schematic diagram of an eddy current disc according to the Embodiment 1 of the present invention.

As shown in FIG. 2, a disc body of the eddy current disc 21 is prepared by stamping and drawing soft iron serving as a magnetic conductive material and is annular. Three annular bands are formed along the radial direction from outside to inside, namely an induction area 21a, a radiating area 21b and a thermal insulation area 21c. A first connecting hole 26 is formed on the thermal insulation area 21c.

As shown in FIG. 3, the first copper plate 22 is welded on a left end face of the induction area 21a; multiple layers of aluminized polyester films 23 are coated on left and right end faces of the thermal insulation area 21c and a wall of the first connecting hole 26 to serve as thermal insulation materials; and the radiating area 21b is composed of radiating fins 24 and radiating ribs 25 which are used for connecting the induction area 21a and the thermal insulation area 21c and are arranged along a circumferential direction. The induction area 21a is parallel to a left side of the thermal insulation area 21c, and is in smooth connection through the radiating fins 24 and the radiating ribs 25 of the radiating area 21b. The radiating fins 24 form axial flow radiating fins, and positions of the air holes 16 on the fan fixing disc 3 correspond to a position of the radiating area 21b. The radiating fins 24 and the radiating ribs 25 are uniformly arranged and are symmetrically arranged in groups.

As shown in FIG. 4, a fixing ring 41 in the same axial direction is arranged on an excircle of the second bearing 4; second connecting holes 42 corresponding to the first connecting hole 26 of the eddy current disc 21 are formed on left and right end faces of the fixing ring 41; the right end face of the fixing ring 41 is located on a left side of a right end face of the second bearing 4, such that the right end face of the second bearing 4 and the excircle on a right side of the right end face of the fixing ring 41 form a rightward lug boss 43; a through hole at a center of the disc body of the eddy current disc 21 is sleeved on the lug boss 43 (i.e., on the excircle of the second bearing 4 on the right side of the right end face of the fixing ring 41), and the eddy current disc 21 is fixedly connected with the second bearing 4 by bolts through the first connecting hole 26 and the second connecting holes 42.

In practical application, the small electromagnet core 13 is electrified to suck the small suction disc 12 to drive the eddy current disc 21 to rotate with the transmission disc 14; the eddy current disc 21 is in flexible connection with the fan fixing disc 3; the fan fixing disc 3 rotates differentially with the eddy current disc 21. A large amount of heat is produced and accumulated at the induction area 21a of the eddy current disc 21; after being transferred to the radiating area 21b, a part of heat is discharged from the air holes 16 with rotation of the radiating fins 24, and a part of heat is transferred to the excircle of the second bearing 4 along the disc body. Since a connecting area between the eddy current disc 21 and the second bearing 4 is limited, and the thermal insulation materials effectively prevent the heat from being transferred to the excircle of the second bearing 4 along a contact surface, the heat on the disc body of the eddy current disc 21 will not be quickly transferred to an inner circle of the second bearing 4, but is retained on the disc body of the eddy current disc 21 and is gradually discharged from the air holes 16 with rotation of the radiating fins 24, so that the heat will not be transferred to the first bearing 2 and the fan fixing disc 3 through the spindle 1. When being electrified, the large electromagnet core 9 sucks the large suction disc 8 to drive the fan fixing disc 3 to rotate with the transmission disc 14, and the fan fixing disc 3 rotates at the same speed as the eddy current disc 21 to generate no flexible connection. A radial movement of the eddy current disc 21 is prevented by a radial supporting force of the lug boss 43 and the connecting bolts, and an axial movement of the eddy current disc 21 is prevented by an axial supporting force of the end face of the fixing ring 41 and the connecting bolts.

Since the eddy current disc 21 in the Embodiment 1 does not need to load the permanent magnets, the eddy current disc 21 can be manufactured to be lighter, and a structural weight and a structural rigidity thereof can be further reduced, in such a manner that, when matching with an engine with a high rotating speed, a starting torque of the eddy current disc 21 will be smaller, and the impact on the spindle 1 is correspondingly reduced.

A first alternative mode of the connecting structure of the eddy current disc 21 and the second bearing 4 in the Embodiment 1 lies in that, no thermal insulation material is coated on the thermal insulation area 21c of the eddy current disc 21, and a ceramic thermal insulation pad 31 is arranged between the left end face of the thermal insulation area 21c of the eddy current disc 21 and the right end face of the fixing ring 41.

As shown in FIG. 5, the thermal insulation pad 31 is a circular ring-shaped ceramic thin plate, and a third connecting hole 32 corresponding to the first connecting hole 26 is formed on the thin plate. Grooves 33 pointing to a center are formed on left and right end faces of the thin plate. The grooves 33 can reduce an area of a contact surface. The heat on the excircle of the second bearing 4 is drawn out with the air in the grooves 33 by means of a negative pressure formed by the rotation of the radiating fins when the eddy current disc 21 rotates, so as to improve air flowability on a contact part of the excircle of the second bearing 4 and improve a radiating efficiency. Bolts are sequentially penetrated through the second connecting holes 42, the third connecting hole 32 and the first connecting hole 26 for fixedly connecting the second bearing 4, the thermal insulation pad 31 and the eddy current disc 21.

A second alternative mode of the connecting structure of the eddy current disc 21 and the second bearing 4 in the Embodiment 1 lies in that, the induction area 21a of the eddy current disc 21 is on a right side of the thermal insulation area 21c and is in smooth connection through the radiating fins 24 and the radiating ribs 25 of the radiating area 21b. The through hole at the center of the disc body of the eddy current disc 21 is sleeved on the excircle on a left side of the left end face of the fixing ring 41; the thermal insulation pad 31 is arranged between the right end face of the thermal insulation area 21c of the eddy current disc 21 and the left end face of the fixing ring 41; and the eddy current disc 21 is fixedly connected with the second bearing 4 by bolts through the first connecting hole 26, the third connecting hole 32 and the second connecting holes 42.

Figure 6:
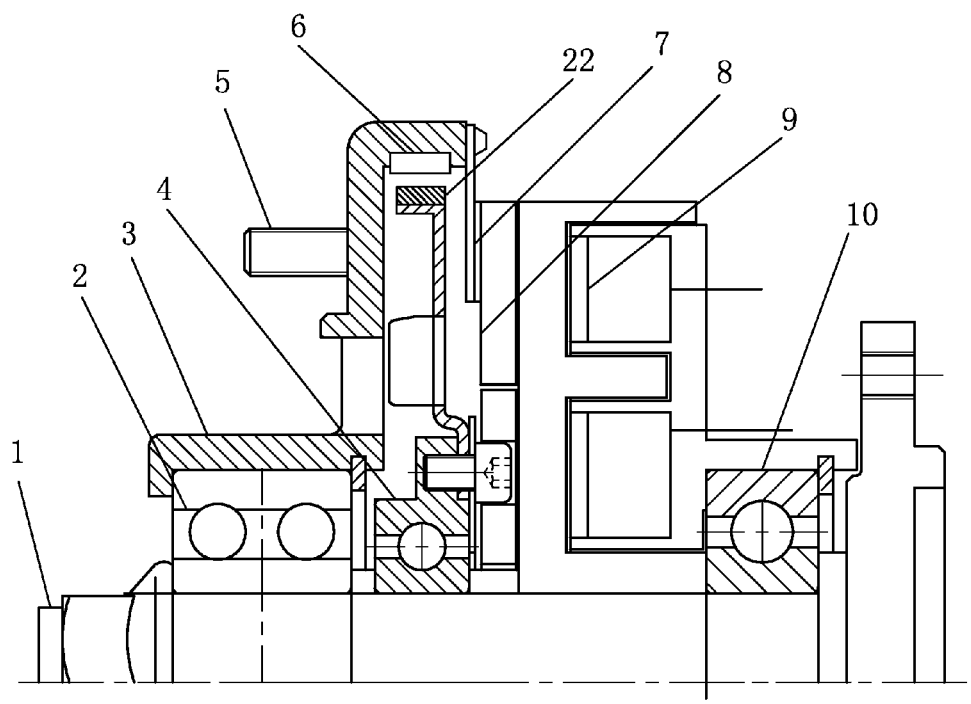
FIG. 6 is a structural schematic diagram of the low-carbon economical electromagnetic fan clutch according to an Embodiment 2 of the present invention.

As shown in FIG. 6, in an Embodiment 2, based on the basic structure of the Embodiment 1, the first permanent magnets 6 are arranged on an inner end face of a circumferential wall of the fan fixing disc 3, and the first copper plates 22 are fixed at corresponding positions on a circumferential wall of the eddy current disc 21. The first permanent magnets 6 and the first copper plates 22 are so arranged as to further increase the flexible connection torque, to enable the fixing disc of the clutch fan with the same specification to reach a higher rotating speed in flexible connection.

Figure 7:
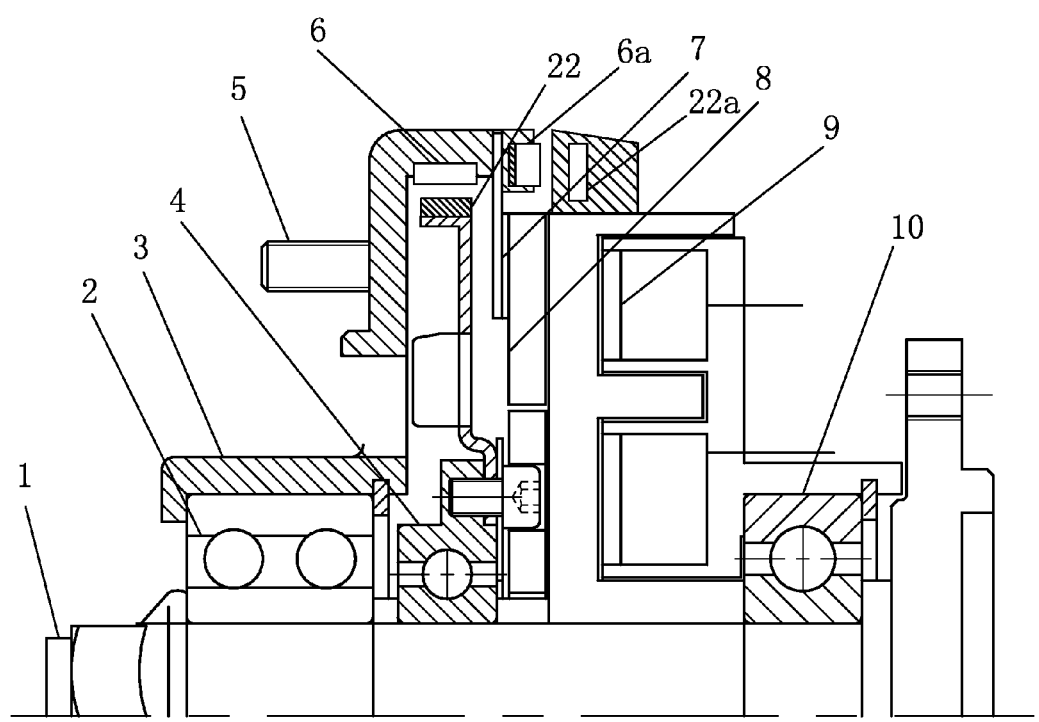
FIG. 7 is a structural schematic diagram of the low-carbon economical electromagnetic fan clutch according to an Embodiment 3 of the present invention.

As shown in FIG. 7, in an Embodiment 3, based on the basic structure of the Embodiment 1, the first permanent magnets 6 are arranged on an inner end face of a circumferential wall of the fan fixing disc 3, and the first copper plates 22 are fixed at corresponding positions on a circumferential wall of the eddy current disc 21. Second permanent magnets 6a are further arranged on a right end face of the circumferential wall of the fan fixing disc 3. The second permanent magnets 6a are uniformly arranged and are symmetrically arranged in groups. The second permanent magnets 6a are sucked on a soft iron disc in the circumferential wall of the fan fixing disc 3. Second copper plates 22a are fixed at positions corresponding to the second permanent magnets 6a in a circumferential wall of the transmission disc 14. The first permanent magnets 6 and the second permanent magnets 6a are so arranged as to produce flexible connection with the corresponding copper plates of different disc bodies, in order to relieve the impact on the corresponding disc bodies when being started to rotate and make full use of the rotating energy of the disc bodies.

Figure 8:
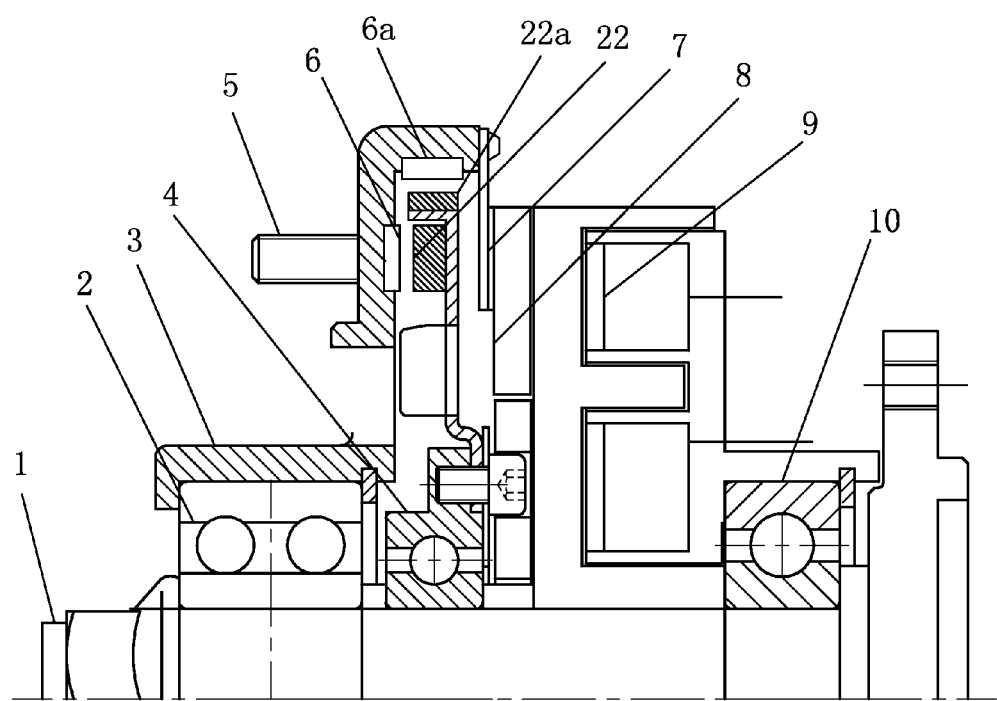
FIG. 8 is a structural schematic diagram of the low-carbon economical electromagnetic fan clutch according to an Embodiment 4 of the present invention.

As shown in FIG. 8, in an Embodiment 4, based on the basic structure of the Embodiment 1, the first permanent magnets 6 are arranged on the right end face of the fan fixing disc 3 around the spindle 1, and the first copper plates 22 are fixed at the corresponding positions on the left end face of the eddy current disc 21 to serve as the first conductive non-magnetic-conductive material. Second permanent magnets 6a are arranged on an inner end face of a circumferential wall of the fan fixing disc 3, and second copper plates 22a serving as a second conductive non-magnetic-conductive material are fixed at corresponding positions on a circumferential wall of the eddy current disc 21. In the Embodiment 4, a larger traction is provided by two groups of flexible connections, such that the differential rotating speed of the fan fixing disc 3 with the eddy current disc 21 can be effectively improved.

In the present invention, the disc body of the eddy current disc 21 can be made of other conventional magnetic conductive materials, the copper plates can be replaced by other conventional conductive non-magnetic-conductive materials; the induction area, the radiating area and the thermal insulation area of the eddy current disc 21 can be manufactured in an integrated casting manner or a separable combination manner. The radiating fins of the radiating area of the eddy current disc 21 can also be processed into centrifugal radiating fins.

The disc bodies of the fan fixing disc 3 and the eddy current disc 21 are manufactured by stamping and drawing low-carbon steel; the radiating fins 24 and the radiating ribs 25 of the thermal insulation area 21c on the disc body of the eddy current disc 21 can be directly formed in the stamping process.

Other thermal insulation materials can be coated on the thermal insulation area 21c.

The foregoing embodiments are merely descriptions for the preferred implementations of the present invention, rather than limiting the scope of the present invention. Various variations and improvements, made by those of ordinary skill in the art to the technical solutions of the present invention on the premise of not deviating from the design spirit of the present invention, shall fall within the protection scope determined by the claims of the present invention.

INDUSTRIAL APPLICABILITY

After simple adaptive modifications are made according to various engine models, the low-carbon economical electromagnetic fan clutch of the present invention can be applied to various motor vehicles, so that the market prospect is very large and the industrial applicability is very strong.

What is claimed is:

1. A low-carbon economical electromagnetic fan clutch, comprising a spindle (1), a fan fixing disc (3) and an eddy current disc (21), wherein:
   the fan fixing disc (3) and the eddy current disc (21) are sequentially arranged at a left end of the spindle (1) along an axial direction from left to right; one group or multiple groups of first permanent magnets (6) are arranged on the fan fixing disc (3) around the spindle (1), and a first conductive non-magnetic-conductive material is fixed at a corresponding position of the eddy current disc (21); the fan fixing disc (3) is rotationally connected with the spindle (1) through a first bearing (2), and the eddy current disc (21) is rotationally connected with the spindle (1) through a second bearing (4);
   a disc body of the eddy current disc (21) is annular and has three annular bands along a radial direction from outside to inside, namely an induction area (21a), a radiating area (21b) and a thermal insulation area (21c); the non-magnetic-conductive material is fixed on the induction area (21a); a thermal insulation material is arranged on the thermal insulation area (21c); the radiating area (21b) is composed of radiating fins (24) or radiating ribs (25) for connecting the induction area (21a) and the thermal insulation area (21c); a first connecting hole (26) is formed on the thermal insulation area (21c), and an air hole (16) corresponding to a position of the radiating area (21b) is formed on the fan fixing disc (3) around the spindle (1).

2. The low-carbon economical electromagnetic fan clutch, as recited in claim 1, wherein the radiating fin (24) is an axial flow type radiating fin or a centrifugal radiating fin.

3. The low-carbon economical electromagnetic fan clutch, as recited in claim 2, wherein the thermal insulation material is coated on the thermal insulation area (21c), or forms a thermal insulation pad (31) adjacent to the thermal insulation area (21c).

4. The low-carbon economical electromagnetic fan clutch, as recited in claim 3, wherein the thermal insulation pad (31) is a circular ring-shaped thin plate; a third connecting hole (32) corresponding to the first connecting hole (26) is formed on the thin plate, and grooves (33) pointing to a center are formed on left and right end faces of the thin plate.

5. The low-carbon economical electromagnetic fan clutch, as recited in claim 4, wherein a fixing ring (41) in the same axial direction is arranged on an excircle of the second bearing (4); a second connecting hole (42) corresponding to the first connecting hole (26) is formed on the fixing ring (41), and a right end face of the fixing ring (41) is located on a left side of a right end face of the second bearing (4).

6. The low-carbon economical electromagnetic fan clutch, as recited in claim 5, wherein: the first permanent magnets (6) are arranged on a right end face of the fan fixing disc (3), and the first conductive non-magnetic-conductive material is fixed at a corresponding position on a left end face of the eddy current disc (21).

7. The low-carbon economical electromagnetic fan clutch, as recited in claim 6, further comprising a second permanent magnet (6a) and a second conductive non-magnetic-conductive material, wherein: the second permanent magnet (6a) is arranged on an inner end face of a circumferential wall of the fan fixing disc (3), and the second conductive non-magnetic-conductive material is fixed at a corresponding position on a circumferential wall of the eddy current disc (21).

8. The low-carbon economical electromagnetic fan clutch, as recited in claim 5, wherein the first permanent magnets (6) are arranged on an inner end face of a circumferential wall of the fan fixing disc (3), and the first conductive non-magnetic-conductive material is fixed at a corresponding position on a circumferential wall of the eddy current disc (21).

9. The low-carbon economical electromagnetic fan clutch, as recited in claim 8, further comprising a second permanent magnet (6a) and a second conductive non-magnetic-conductive material, wherein: the second permanent magnet (6a) is arranged on a right end face of the circumferential wall of the fan fixing disc (3), and the second conductive non-magnetic-conductive material is fixed at a corresponding position in a circumferential wall of a transmission disc (14).

10. The low-carbon economical electromagnetic fan clutch, as recited in claim 1, wherein the thermal insulation material is coated on the thermal insulation area (21c), or forms a thermal insulation pad (31) adjacent to the thermal insulation area (21c).

11. The low-carbon economical electromagnetic fan clutch, as recited in claim 10, wherein the thermal insulation pad (31) is a circular ring-shaped thin plate; a third connecting hole (32) corresponding to the first connecting hole (26) is formed on the thin plate, and grooves (33) pointing to a center are formed on left and right end faces of the thin plate.

12. The low-carbon economical electromagnetic fan clutch, as recited in claim 11, wherein a fixing ring (41) in the same axial direction is arranged on an excircle of the second bearing (4); a second connecting hole (42) corresponding to the first connecting hole (26) is formed on the fixing ring (41), and a right end face of the fixing ring (41) is located on a left side of a right end face of the second bearing (4).

13. The low-carbon economical electromagnetic fan clutch, as recited in claim 12, wherein: the first permanent magnets (6) are arranged on a right end face of the fan fixing disc (3), and the first conductive non-magnetic-conductive material is fixed at a corresponding position on a left end face of the eddy current disc (21).

14. The low-carbon economical electromagnetic fan clutch, as recited in claim 13, further comprising a second permanent magnet (6a) and a second conductive non-magnetic-conductive material, wherein: the second permanent magnet (6a) is arranged on an inner end face of a circumferential wall of the fan fixing disc (3), and the second conductive non-magnetic-conductive material is fixed at a corresponding position on a circumferential wall of the eddy current disc (21).

15. The low-carbon economical electromagnetic fan clutch, as recited in claim 12, wherein the first permanent magnets (6) are arranged on an inner end face of a circumferential wall of the fan fixing disc (3), and the first conductive non-magnetic-conductive material is fixed at a corresponding position on a circumferential wall of the eddy current disc (21).

16. The low-carbon economical electromagnetic fan clutch, as recited in claim 15, further comprising a second permanent magnet (6a) and a second conductive non-magnetic-conductive material, wherein: the second permanent magnet (6a) is arranged on a right end face of the circumferential wall of the fan fixing disc (3), and the second conductive non-magnetic-conductive material is fixed at a corresponding position in a circumferential wall of a transmission disc (14).

17. The low-carbon economical electromagnetic fan clutch, as recited in claim 1, wherein: the first permanent magnets (6) are arranged on a right end face of the fan fixing disc (3), and the first conductive non-magnetic-conductive material is fixed at a corresponding position on a left end face of the eddy current disc (21).

18. The low-carbon economical electromagnetic fan clutch, as recited in claim 17, further comprising a second permanent magnet (6a) and a second conductive non-magnetic-conductive material, wherein: the second permanent magnet (6a) is arranged on an inner end face of a circumferential wall of the fan fixing disc (3), and the second conductive non-magnetic-conductive material is fixed at a corresponding position on a circumferential wall of the eddy current disc (21).

19. A low-carbon economical electromagnetic fan clutch, comprising a spindle (1) and a fan fixing disc (3), wherein:
the low-carbon economical electromagnetic fan clutch further comprises an eddy current disc (21), wherein: the fan fixing disc (3) and the eddy current disc (21) are sequentially arranged at a left end of the spindle (1) along an axial direction from left to right; one group or multiple groups of first permanent magnets (6) are arranged on the fan fixing disc (3) around the spindle (1), and a first conductive non-magnetic-conductive material is fixed at a corresponding position of the eddy current disc (21); the fan fixing disc (3) is rotationally connected with the spindle (1) through a first bearing (2), and the eddy current disc (21) is rotationally connected with the spindle (1) through a second bearing (4); and
the low-carbon economical electromagnetic fan clutch further comprises a second permanent magnet (6a) and a second conductive non-magnetic-conductive material, wherein: the second permanent magnet (6a) is arranged on an inner end face of a circumferential wall of the fan fixing disc (3), and the second conductive non-magnetic-conductive material is fixed at a corresponding position on a circumferential wall of the eddy current disc (21).

20. A low-carbon economical electromagnetic fan clutch, comprising a spindle (1) and a fan fixing disc (3), wherein:
the low-carbon economical electromagnetic fan clutch further comprises an eddy current disc (21), wherein: the fan fixing disc (3) and the eddy current disc (21) are sequentially arranged at a left end of the spindle (1) along an axial direction from left to right; one group or multiple groups of first permanent magnets (6) are arranged on the fan fixing disc (3) around the spindle (1), and a first conductive non-magnetic-conductive material is fixed at a corresponding position of the eddy current disc (21); the fan fixing disc (3) is rotationally connected with the spindle (1) through a first bearing (2), and the eddy current disc (21) is rotationally connected with the spindle (1) through a second bearing (4); and the low-carbon economical electromagnetic fan clutch further comprises a second permanent magnet (6a) and a second conductive non-magnetic-conductive material, wherein: the second permanent magnet (6a) is arranged on a right end face of a circumferential wall of the fan fixing disc (3), and the second conductive non-magnetic-conductive material is fixed at a corresponding position in a circumferential wall of a transmission disc (14).

* * * * *